No. 634,696.  
J. C. MICHIE.  
INTRENCHING TOOL.  
(Application filed Mar. 7, 1899.)

Patented Oct. 10, 1899.

(No Model.)

Witnesses  
T. P. Britt  
Chas. E. Brock

Inventor  
J. C. Michie  
by  
O'Meara  
Attorneys

THE NORRIS PETERS CO., PHOTO-LITHO., WASHINGTON, D. C.

UNITED STATES PATENT OFFICE.

JOHN C. MICHIE, OF DURHAM, NORTH CAROLINA.

ENTRENCHING-TOOL.

SPECIFICATION forming part of Letters Patent No. 634,696, dated October 10, 1899.

Application filed March 7, 1899. Serial No. 708,161. (No model.)

*To all whom it may concern:*

Be it known that I, JOHN C. MICHIE, a citizen of the United States, residing at Durham, in the county of Durham and State of North Carolina, have invented a new and useful Improvement in Entrenching-Tools, of which the following is a specification.

This invention is a new and useful construction of entrenching-tool adapted to be used in connection with any construction of firearm, but particularly adapted for use in connection with the magazine-rifle now in use.

The object of the invention is to provide an entrenching spade or shovel which can be quickly and easily attached to or detached from a bayonet-scabbard.

Another object is to provide an entrenching shovel or spade which shall be exceedingly strong and durable and will be of such shape that it can be easily carried in the knapsack without inconvenience.

With these objects in view the invention consists in the peculiar construction of the various parts and in their novel combination and arrangement, all of which will be fully described hereinafter and pointed out in the claims.

Figure 1:
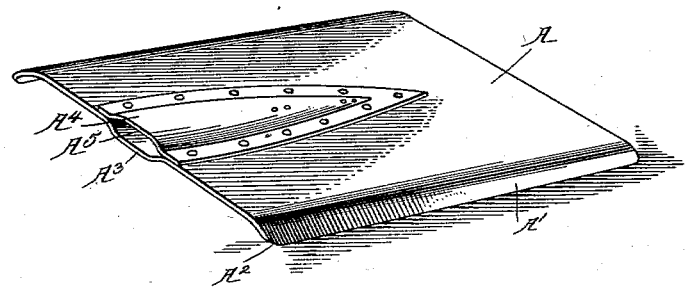
Figure 2:
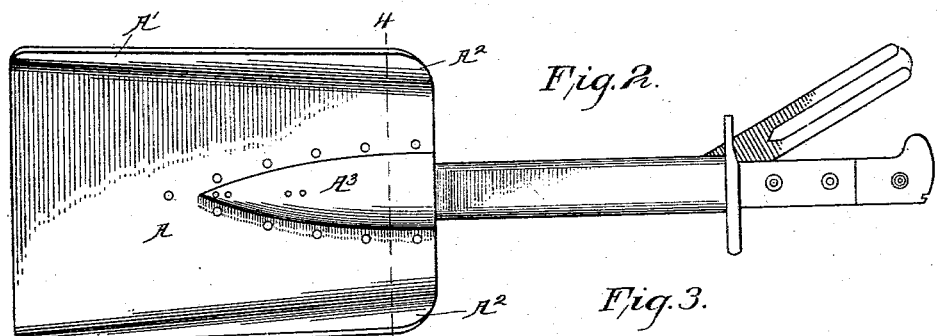
Figure 3:
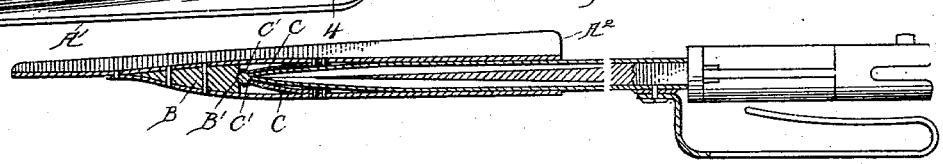
Figure 4:
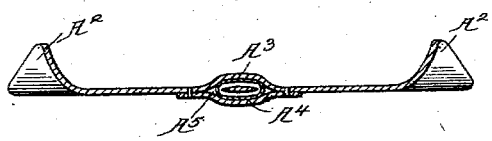

In the drawings forming part of this specification, Figure 1 is a view showing one side of the entrenching shovel or spade. Fig. 2 is a top plan view showing the scabbard connected to the shovel or spade and also having a bayonet inserted in the scabbard. Fig. 3 is a longitudinal section on an enlarged scale. Fig. 4 is a transverse vertical section on the line 4 4 of Fig. 2.

In carrying out my invention I employ a shovel or spade A, which may be of any convenient and suitable size and is preferably made of thin sheet-steel, as shown, so as to produce the slightly-upturned sides A', the upwardly-curved shoulders A², and the centrally-raised portion A³, said raised portion being essentially semi-elliptical in shape, as shown in Fig. 2, and upon the under face of the shovel or spade is riveted a depressed plate A⁴, also semi-elliptical in shape, thus producing a socket A⁵, in the point or apex of which is secured a metal block B. The socket thus formed is intended to receive the lower end of the bayonet-scabbard, and in practice I prefer to construct the socket of such a size that about six inches of the scabbard will be received therein, and in order to hold the said scabbard within the socket, and thereby securely connect the same to the entrenching shovel or spade, I employ the inwardly-projecting spring-plates C, which are secured within the socket and extend toward the metal block B, so that when the point of the scabbard is forced into the socket the ball upon the end of said scabbard will pass between and beyond the spring-plates and be thereby securely fastened in the socket, the ball resting in a slight depression B', produced in the upper end of the block, and the ends of the springs are also bent slightly outwardly, as shown at C', in order to provide a suitable rest and also permit the scabbard to be withdrawn therefrom by means of a quick jerk. The block within the bottom of the socket greatly strengthens the shovel or spade and also prevents the scabbard being pushed in too far. After the scabbard has been properly inserted the bayonet can be fixed within the scabbard, the whole forming a short-handled shovel, and in case a long handle is necessary the bayonet can be affixed to the barrel of the gun.

If desired, the bayonet can be used for digging preliminary to the shoveling operation, and then by inserting the bayonet into the scabbard the device can be used as a shovel and the upturned sides and the curved-up shoulders prevent the dirt slipping off the shovel and also greatly stiffen and strengthen the two.

Having thus fully described my invention, what I claim as new, and desire to secure by Letters Patent of the United States, is—

1. An entrenching-shovel having a socket adapted to receive the scabbard of a bayonet, a stop-block arranged at the bottom of the socket and the fastening-springs for securing the scabbard within the socket, substantially as shown and described.

2. An entrenching-shovel having the upturned sides and upwardly-curved shoulders and the centrally-raised portion, the depressed plate riveted to the bottom of the shovel and providing a socket adapted to receive the bayonet-scabbard, a block secured in the bottom of the socket and the securing-springs also fastened in the socket adjacent to the bottom thereof extending toward each other and also toward the stop-block, substantially as shown and described.

3. An entrenching-shovel having a socket adapted to receive the scabbard, and two inwardly-projecting spring-plates secured within said socket, adapted to engage the end of the scabbard, substantially as described.

JOHN C. MICHIE.

Witnesses:
J. W. BLACKWELL,
LUTHER C. OLDHAM.